United States Patent
Santos

(10) Patent No.: US 8,264,954 B2
(45) Date of Patent: Sep. 11, 2012

(54) METHOD AND DEVICE FOR OPERATING A NETWORK AND COMMUNICATION SYSTEM COMPRISING SUCH DEVICE

(75) Inventor: Jose Santos, Lisbon (PT)

(73) Assignee: Nokia Siemens Networks Oy, Espoo (FI)

( * ) Notice: Subject to any disclaimer, the term of this patent is extended or adjusted under 35 U.S.C. 154(b) by 144 days.

(21) Appl. No.: 12/672,542

(22) PCT Filed: Aug. 4, 2008

(86) PCT No.: PCT/EP2008/060240
§ 371 (c)(1),
(2), (4) Date: Jun. 1, 2010

(87) PCT Pub. No.: WO2009/019256
PCT Pub. Date: Feb. 12, 2009

(65) Prior Publication Data
US 2011/0099414 A1    Apr. 28, 2011

(30) Foreign Application Priority Data
Aug. 6, 2007 (EP) .................................... 07015402

(51) Int. Cl.
*G01R 31/08* (2006.01)

(52) U.S. Cl. ............. 370/225; 370/222; 370/242; 398/3

(58) Field of Classification Search .......... 370/222–224, 370/241, 460; 398/3–4; 714/717
See application file for complete search history.

(56) References Cited

U.S. PATENT DOCUMENTS

| | | | |
|---|---|---|---|
| 6,430,151 B1 | 8/2002 | Glas et al. | |
| 7,003,705 B1 * | 2/2006 | Yip et al. | 714/717 |
| 7,440,397 B2 * | 10/2008 | Tsurumi et al. | 370/222 |
| 7,606,240 B1 * | 10/2009 | Shah | 370/400 |
| 7,944,815 B2 * | 5/2011 | Thomson et al. | 370/222 |
| 2003/0165119 A1 * | 9/2003 | Hsu et al. | 370/258 |
| 2004/0008721 A1 * | 1/2004 | Ying et al. | 370/460 |
| 2004/0223503 A1 * | 11/2004 | Lynch et al. | 370/404 |
| 2005/0201275 A1 * | 9/2005 | Ying et al. | 370/222 |
| 2005/0207348 A1 * | 9/2005 | Tsurumi et al. | 370/241 |
| 2006/0215546 A1 * | 9/2006 | Tochio | 370/218 |
| 2006/0250969 A1 * | 11/2006 | Florit et al. | 370/241 |
| 2007/0165517 A1 * | 7/2007 | Binetti et al. | 370/222 |

FOREIGN PATENT DOCUMENTS
EP        1062787 B1    8/2003
* cited by examiner

*Primary Examiner* — Michael Thier
*Assistant Examiner* — Vincelas Louis
(74) *Attorney, Agent, or Firm* — Laurence A. Greenberg; Werner H. Stemer; Ralph E. Locher

(57) ABSTRACT

A method and a device are provided for operating a network, wherein the network comprises several network elements that are connected via a ring, wherein a first segment is of a first type of connection and wherein a second segment is of a second type of connection, wherein the ring comprises at least one first segment and at least one second segment and wherein one network element of the network elements is a ring master comprising a primary port and a secondary port, comprising the steps (i) a failure of at least one of the at least one first segment is detected by the ring master; (ii) the ring master unblocks its secondary port; and (iii) the ring master sends a first message via its primary port and via its secondary port.

14 Claims, 8 Drawing Sheets

Ring Master

Ring Master

METHOD AND DEVICE FOR OPERATING A NETWORK AND COMMUNICATION SYSTEM COMPRISING SUCH DEVICE

BACKGROUNG OF THE INVENTION

Field of the Invention

The invention relates to a method and a device for operating a network and to a communication system comprising such device.

An Ethernet Ring Protection (ERP) mechanism and protocol are disclosed in, e.g., EP 1 062 787 B1. In addition, there exists another ring protection mechanism called Ethernet Automatic Protection Switching (EAPS) as described in, e.g., IETF RRC3619.

Such ring protection mechanisms comprise a ring master RM (also referred to as a redundancy manager) to coordinate ring protection activities.

Protection in this sense means in particular that a link-layer loop in a physical Ethernet is avoided. The ring master is equipped to prevent the ring from forming such Ethernet loops.

When the ring master is notified that the ring is healthy (e.g., via test packets that are sent by the ring master via both of its ports), i.e. all ring nodes (network elements) and links (segments or arcs) are operational, the ring master breaks the link-layer loop by blocking traffic reception and transmission at one of its ring ports (the ring master's secondary port).

All traffic is blocked at that secondary port except for Ethernet ring protection control traffic, e.g., test packets. Preferably, such control traffic is sent via a control virtual LAN (VLAN).

From a link-layer's perspective, blocking traffic at the ring master's secondary port transforms the ring's topology into a chain of nodes (network elements). This is necessary in typical layer 2 (L2) networks (see also document IEEE 802.1 for further explanation). The ring master blocking its secondary port resulting in a topology of a chain of network elements is considered a normal operational state of the Ethernet Ring Protection mechanism.

FIG. 1 shows such an ERP structure. The ring comprises network elements or nodes 101 to 106, wherein the node 101 is a Ring Master RM (also referred to as redundancy manager) with a primary port P and a secondary port S. As stated before, in normal operation, the Ring Master blocks its secondary port S resulting in the nodes 101 to 106 building a chain topology for the user traffic.

Link or Port Failure:

When a failure emerges in the ring, e.g., a link failure of a ring segment, the Ring Master unblocks its secondary port S thereby reestablishing communication between all ring nodes.

The failure can be directly detected by the Ring Master itself if the failure occurs at one of its ports. Alternatively, the Ring Master can be notified by another network element of the ring about a failure detected at one of the network element's ports. In such case, the affected network element sends a Link Down message to the Ring Master. The Ring Master subsequently unblocks its secondary port S (see FIG. 2).

Failure Recovery:

When a network element of the ring detects that a failure recovered, it sends a notification to the Ring Master indicating that the link or port is operative again. This can be achieved by the network element sending a Link Up message to the Ring Master. The network element will switch over to a pre-forwarding state blocking all traffic except test packets (health-check messages conveyed via the VLAN). In this pre-forwarding state the network element waits for a message from the Ring Master to switch over to normal operation (or forwarding state) again.

The Ring Master blocks the secondary port S again and sends the message to the network element to get back to normal operation. The Ring Master allows the network element to migrate from its pre-forwarding state to normal operation (forwarding state) only after the Ring Master blocked its secondary port S. This avoids configuration of a link-layer loop.

Preferably, the Ring Master assesses the operational state of the whole ring by frequently sending heath-check packets via both of its ring interfaces, i.e. via its primary port P and its secondary port S. These health-check packets (also referred to as test packets) may be conveyed via a control VLAN. If the ring is operational, the Ring Master receives its test packets sent via the respective other interface. If the test packets are not received, the ring may be broken and protection recovery actions should be initiated.

FIG. 3 to FIG. 6 show an example of a problematic scenario.

The ring comprises three network elements (nodes) running an ERP protocol: Ring Nodes 301, 302 and 303, wherein network element 303 acts as Ring Master (or redundancy manager RM) comprising a primary port 304 and a secondary port 305. In normal operation, the Ring Master 303 blocks its secondary port 305. Further, nodes 306 and 307 are network elements that are not running a Ethernet protocol, but a different technology instead, here in this example, dense wave division multiplexing (DWDM).

In FIG. 4, a failure occurs on the link between node 306 and node 307. As both nodes 306 and 307 are no Ethernet nodes (and hence no logical participants in an ERP network) there will be no Link Down message initiated by either node 306 or 307. Hence, the Ring Master 303 detects the failure upon missing heath-check packets that are no longer received at either its primary port 304 or its secondary port 305. Subsequently, the Ring Master 303 opens its secondary port 305 as shown in FIG. 5. The ring is operative despite the failure between nodes 306 and 307.

When the failure between nodes 306 and 307 is removed, both nodes 306 and 307 immediately use the link towards the respective other DWDM node. As the Ring Master 303 is not aware of the removal of the failure, it cannot be assured that the secondary port 305 of the Ring Master 303 is blocked before the link between nodes 306 and 307 is up and running again. This will result in a temporary loop (see FIG. 6).

BRIEF SUMMARY OF THE INVENTION

The object to be solved is to avoid the disadvantages as described supra and to provide an approach avoiding a temporary loop of a link layer.

This problem is solved according to the features of the independent claims. Further embodiments result from the depending claims.

In order to overcome this problem a method is provided for operating a network
  wherein the network comprises several network elements that are connected via a ring;
  wherein a first segment is of a first type of connection and wherein a second segment is of a second type of connection;
  wherein the ring comprises at least one first segment and at least one second segment;

wherein one network element of the network elements is a ring master comprising a primary port and a secondary port;

comprising the steps:

a failure of at least one of the at least one first segment is detected by the ring master;

the ring master unblocks its secondary port;

the ring master sends a first message via its primary port and via its secondary port.

Advantageously, this approach is capable of handling ring networks comprising segments of different technologies by enabling the ring master to convey the first message via its primary port and via its secondary port.

It is to be noted that the failure of a first segment can be directly detected by the ring master itself via health-check packets that are no longer received at the ring master's ports (time-out). Preferably, after a certain number of missing health-check packets, the ring master assumes that a link has broken down.

Alternatively, the ring master may be notified about a failure by a network element and hence indirectly detects the failure.

It is an embodiment that each network element that received the first message from the ring master sends back an acknowledge message (or a message that could be interpreted as an acknowledge message) and forwards the first message to the next network element.

As another embodiment, the method comprises the step:

if a network element does not receive an acknowledge message, this network element enters a pre-forwarding state.

Hence, the network that forwards the first message to an adjacent network component and does not receive a response (acknowledge) may assume that the adjacent network component is of a different technology of network type, e.g., runs a different communication protocol. As the adjacent network component is different, it is not able to understand or interpret the first message and/or does not know as how to reply to this first message. Thus, there will be no acknowledge message sent from the adjacent network element to the sender of the first message. This sending network element may wait for a predetermined period of time and or send a predetermined number of first messages towards the adjacent network element: Without a response (e.g., after a time-out), the sending network element preferably enters the pre-forwarding state.

It is also an embodiment that the network element entering or having entered the pre-forwarding state blocks its port towards the network element that did not send the acknowledge message.

This ensures that after the defective link is up and running the port still stays blocked until instructed otherwise by the ring master.

In a further embodiment, the network element entering the pre-forwarding state sends a second message to the ring master. This second message may be a notification upon the state change of the respective network element.

It is yet an embodiment that the first message is a pre-forwarding state request.

It is also an embodiment that the first message is sent via a protocol that addresses a network element that is directly connected to, in particular an immediate neighbor of, the sending network element.

Preferably, a special message or protocol is used in order to address adjacent network elements, i.e. the successor or a particular network element according to the respective ring topology.

It is an embodiment that the first message is sent via a slow protocol, in particular via an Ethernet slow protocol.

In yet another embodiment the first segment comprises a non-Ethernet connection. Such non-Ethernet connection may in particular be of the following type:

a wave division multiplexing connection (WDM);

a dense wave division multiplexing connection (DWDM).

In a further embodiment the second segment comprises an Ethernet connection.

I a particular embodiment the network element of the at least one second segment runs an Ethernet ring protection mechanism.

It is an embodiment that the Ethernet ring protection mechanism comprises at least one of the following:

an Ethernet Ring Protection (ERP) protocol;

an Ethernet Automatic Protection Switching (EAPS) protocol.

It is also an embodiment that the steps of the method(s) provided herewith are run repeatedly.

This allows regular updates of the status of the ring and in particular it allows the ring master to react according to incoming and/or missing messages.

It is yet another embodiment that test packets are sent by the ring master via its primary port and via its secondary port. Such test packets may comprise health-check messages. Test packets and/or health-check messages may be conveyed via a virtual LAN (VLAN) connection, in particular via a control VLAN.

In an additional embodiment the method further comprises the steps:

after recovery of the failure the ring master blocks its secondary port and sends a third message via its primary port and via its secondary port;

upon receipt of the third message, each network element residing in the pre-forwarding state switches to normal operation.

By sending the third message, in particular a "get back to normal operation"-message, the ring master allows the network element that is in the pre-forwarding state to get back to normal operation (or in a forwarding state). It is advantageously that the ring master first blocks its secondary port before it sends the third message. In such way the ring master assures that there is no (temporary) loop within the ring.

The problem stated supra is also solved by a device of a network comprising a processor unit that is equipped and/or arranged such that the method as described herein can be run on said processor.

In an embodiment, the device is a communication device, in particular a network element.

Also, the device can be a ring master of a ring network.

Furthermore, the problem as stated above is also solved by a communication system comprising a device as described herein.

Embodiments of the invention are shown and illustrated in the following figures:

FIG. 7 to FIG. 15 show an example a how a ring network may react on a failure between non Ethernet equipment of the ring in order to avoid a temporary loop within the ring network.

Figure 1:
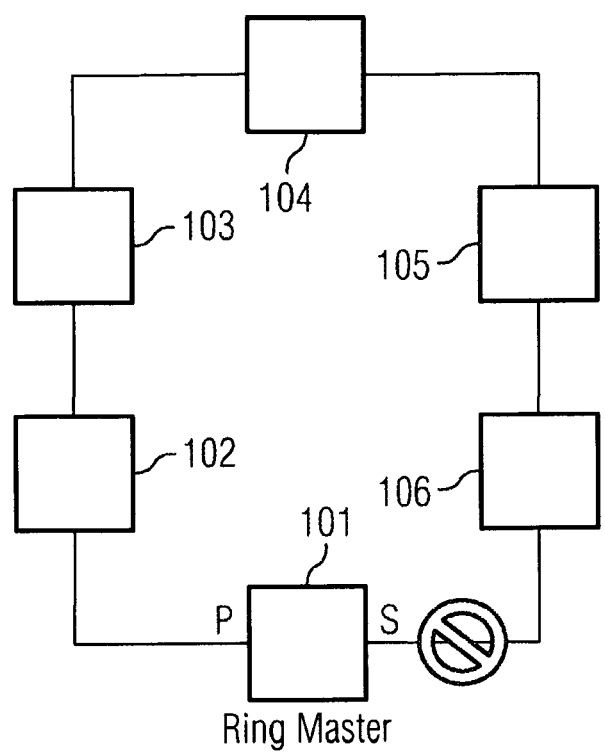
FIG. 1 is a diagram of a Ethernet Ring Protection structure according to the prior art.
Figure 2:
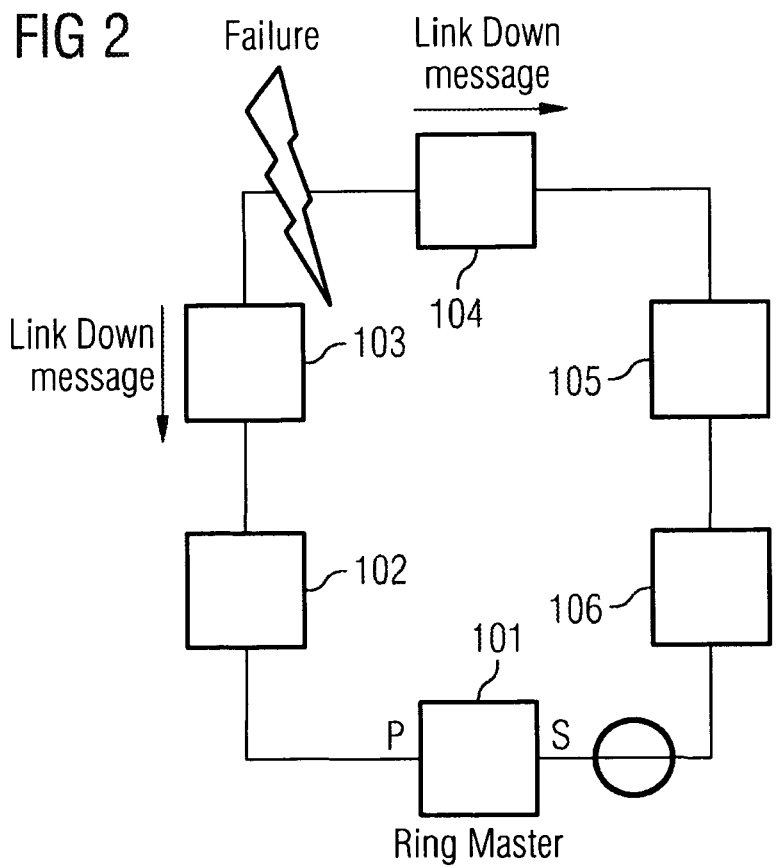
FIG. 2 is a similar diagram with an indicated failure.
Figure 3:
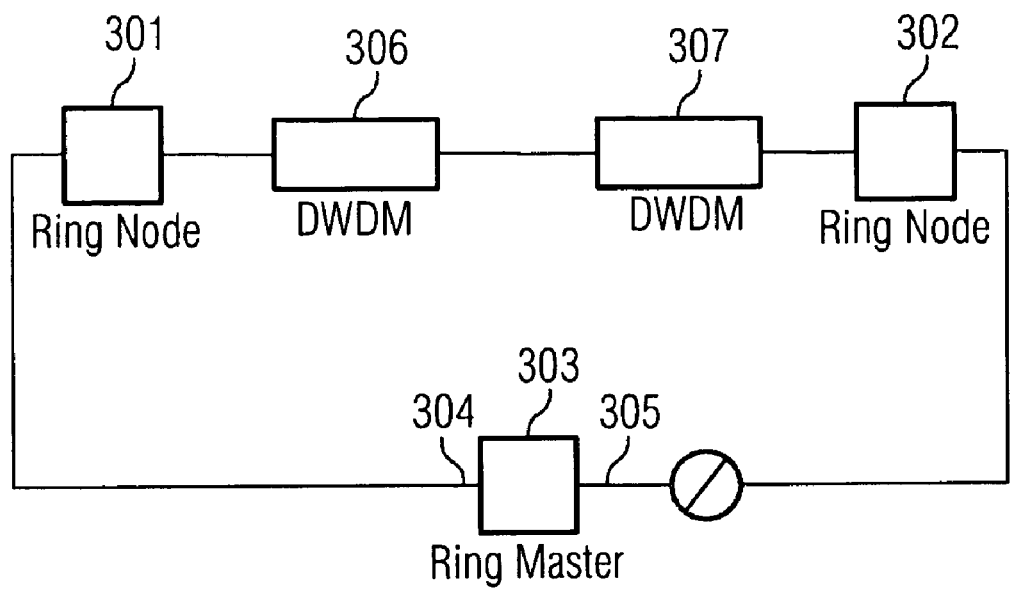
FIG. 3 to FIG. 6 are diagrams of a ring illustrating examples of a problematic scenario.
Figure 4:
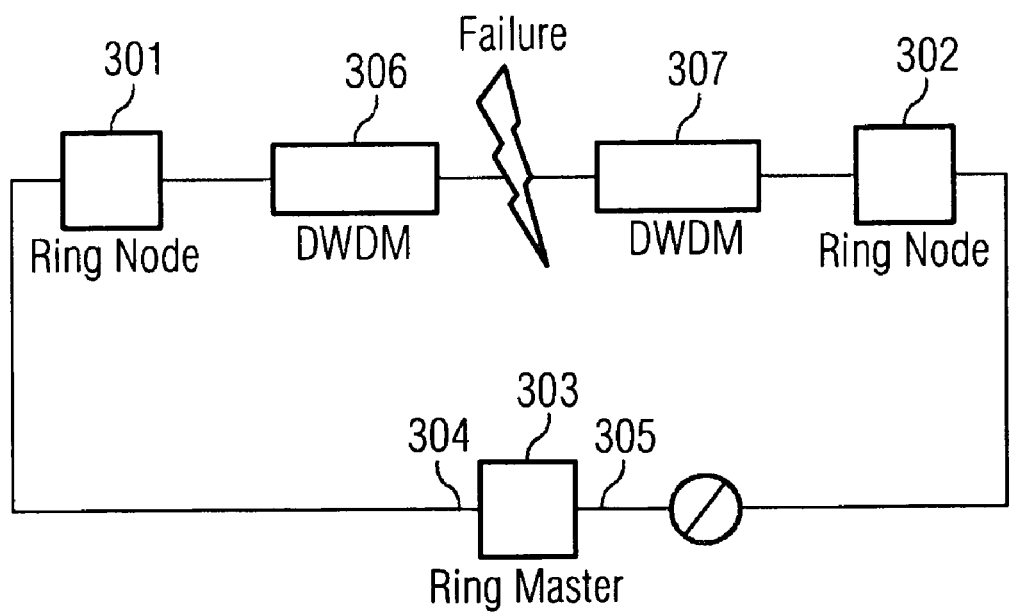
Figure 5:
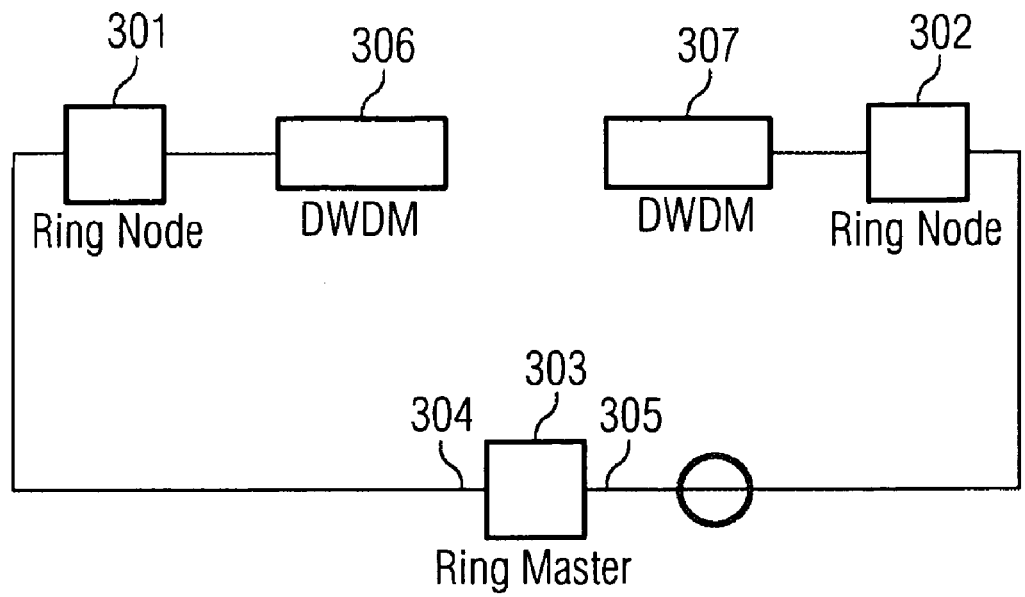
Figure 6:
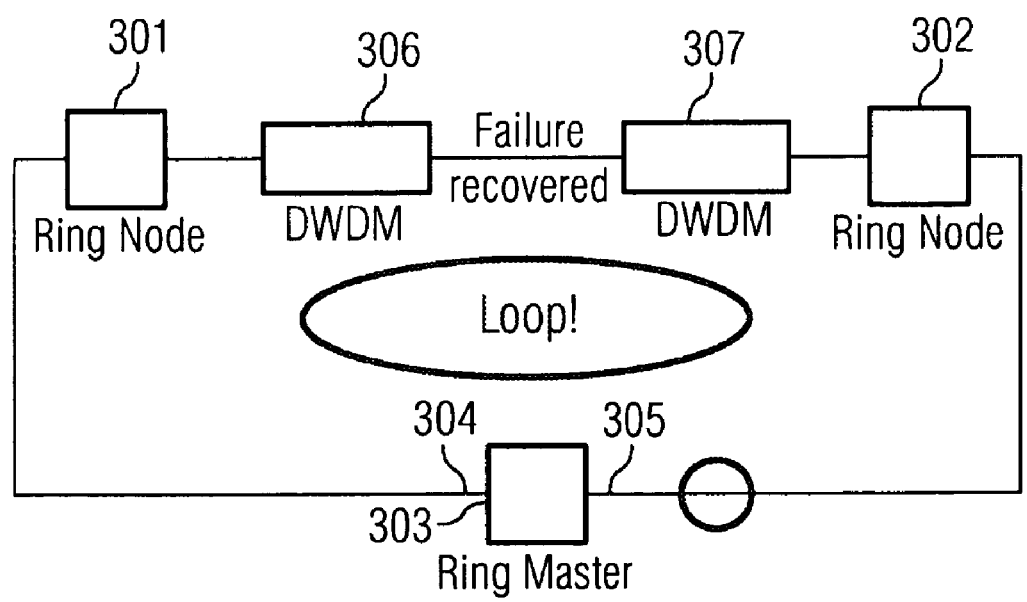

The ring network comprises network elements or (ring) nodes 601, 602, 603, 604 and 605 operating according to an Ethernet Ring Protection (ERP) protocol. The network element 601 is a Ring Master (also referred to as a redundancy manager RM) comprising a primary port 608 and a secondary port 609. The ring network also comprises network elements 606 and 607, both are running a protocol that is different from ERP. In this example the network elements 606 and 607 operate in a dense wave division multiplexing (DWDM) mechanism.

Figure 7:
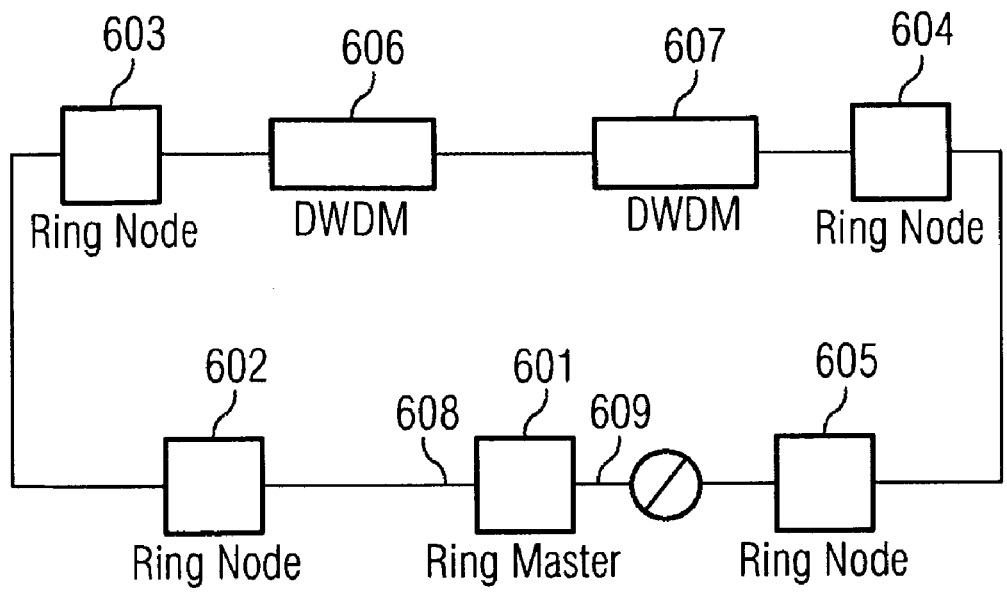
FIG. 7 shows a ring network comprising Ethernet conform network elements and non-Ethernet network elements in normal operation.

FIG. 7 shows the ring network in normal operation. The Ring Master 601 has its secondary port 609 blocked, the network elements 602 to 607 operate as a chain structure:

601<->602<->603<->606<->607<->604<->605.

Figure 8:
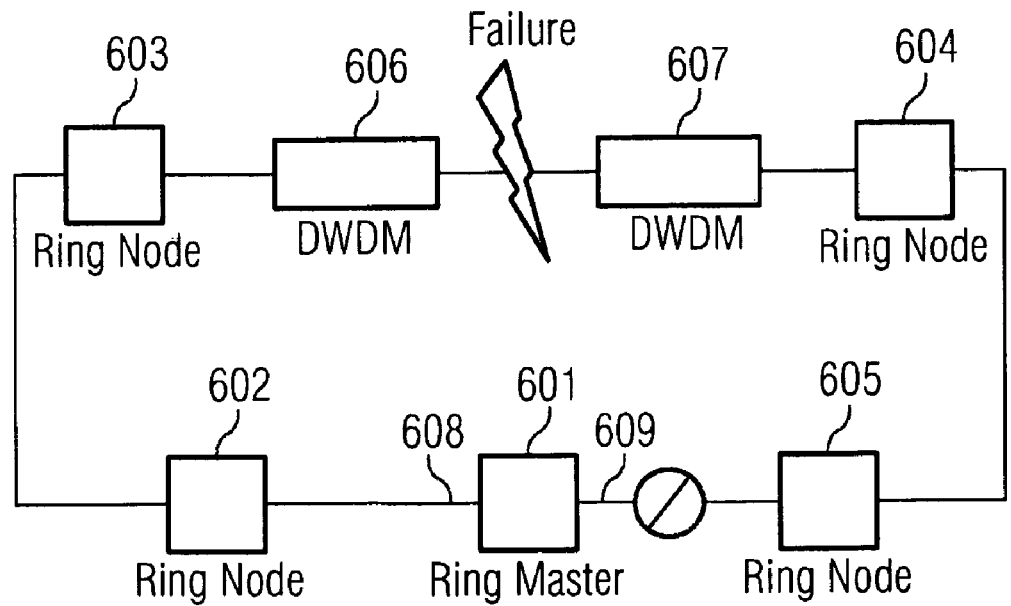
FIG. 8 shows the ring network of FIG. 7 with a link failure at the link between two non-Ethernet conform network elements.
Figure 9:
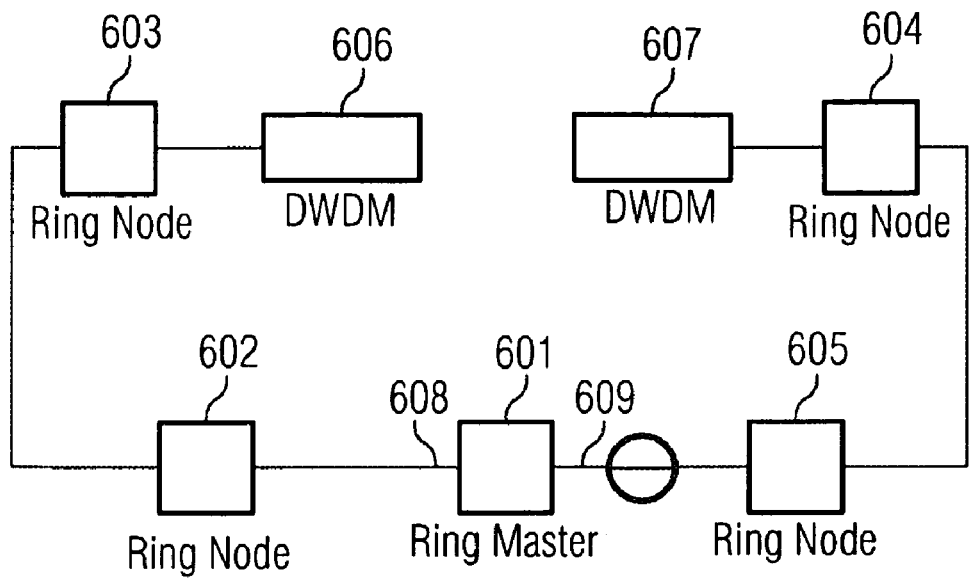
FIG. 9 shows the ring network of FIG. 8, wherein a ring master unblocks its secondary port to maintain user traffic throughout the ring network.

According to FIG. 8, a failure occurs at the link between the non-Ethernet network elements 606 and 607. The Ring Master 601 detects this failure as health-check packets that are sent via control VLAN from its primary and secondary ports no longer arrive at the Ring Master's respective other port. As the link failure interrupts the data flow in the existing ring structure of FIG. 7, the Ring Master 601 opens its secondary port 609 (see FIG. 9) thereby allowing user data to be conveyed according to the following chain structure:

606<->603<->602<->601<->605<->604<->607.

Figure 10:
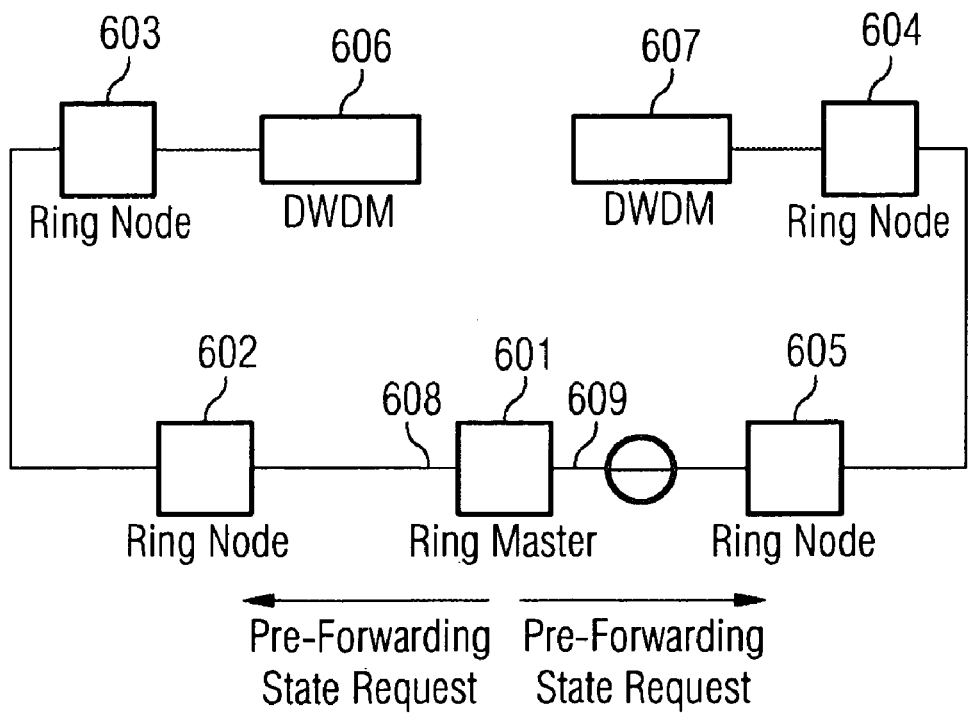
FIG. 10 shows the ring network of FIG. 9, wherein the ring master sends "Pre-Forwarding State Request" messages via its primary and secondary ports.
Figure 11:
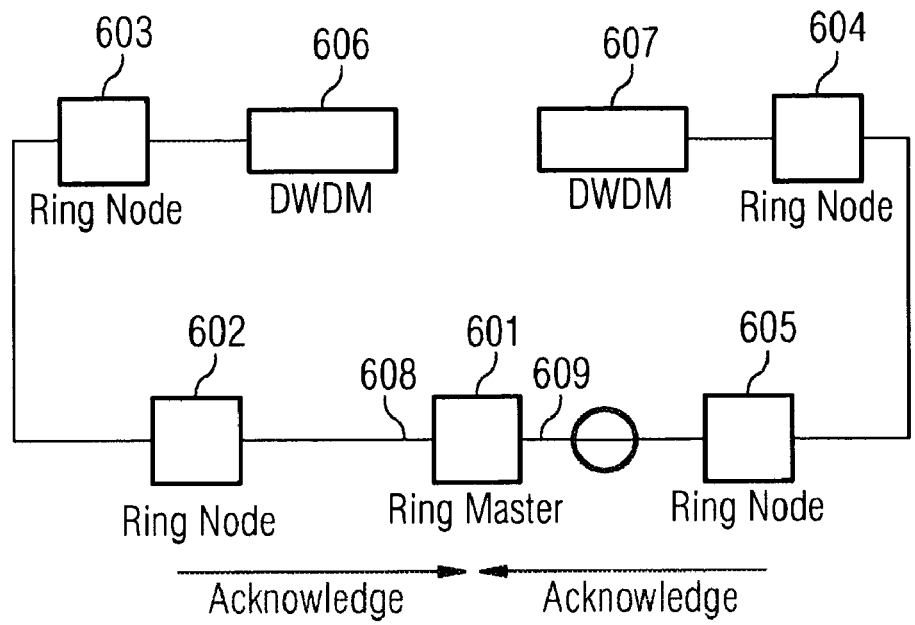
FIG. 11 shows the ring network of FIG. 10, wherein the ring master receives Acknowledge messages from its adjacent network elements.
Figure 12:
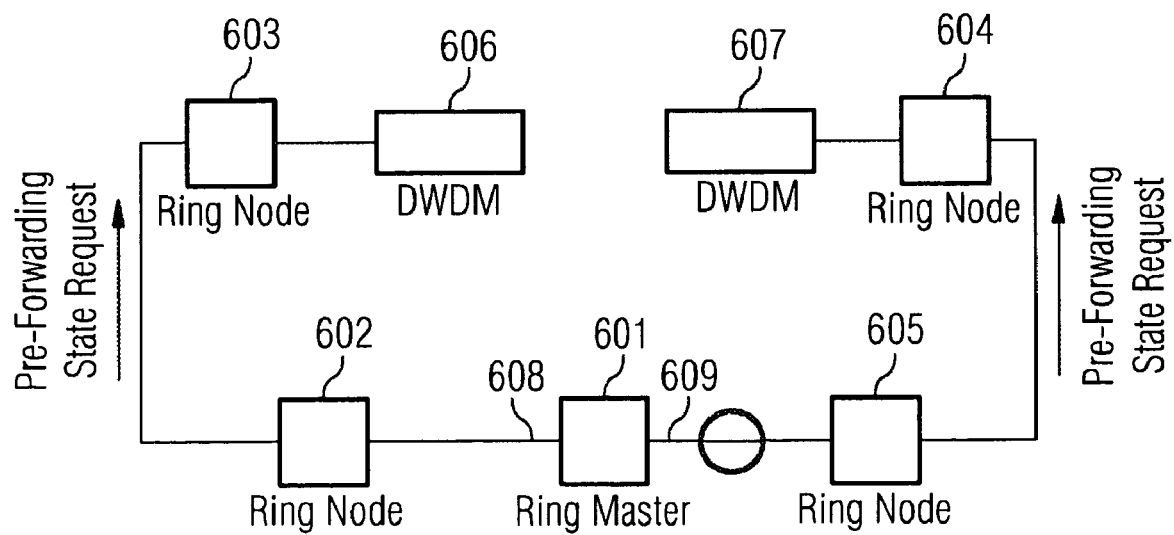
FIG. 12 shows the ring network of FIG. 11, wherein the "Pre-Forwarding State Request" messages are forwarded.
Figure 13:
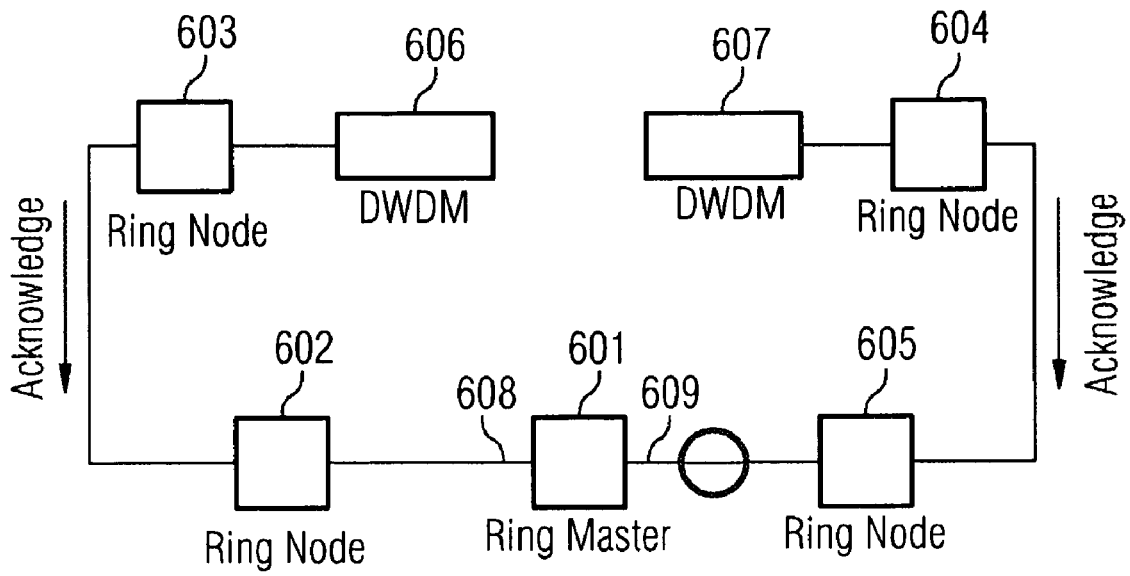
FIG. 13 shows the ring network of FIG. 12, wherein the forwarded "Pre-Forwarding State Request" messages are replied by sending Acknowledge messages.

As per FIG. 10, the Ring Master 601 sends a "Pre-Forwarding State Request" via its primary port 608 and via its secondary port 609 to its neighbor network elements 602 and 605. As shown in FIG. 11, the Ring Master 601 receives an Acknowledge message from these neighbor network elements 602 and 605. FIG. 12 shows that the network element 602 sends the "Pre-Forwarding State Request" to its adjacent network element 603 and the network element 605 sends the "Pre-Forwarding State Request" to its adjacent network element 604. Both network elements 602 and 605 receive each an Acknowledge message from its adjacent network element 603 and 604 as shown in FIG. 13.

Figure 14:
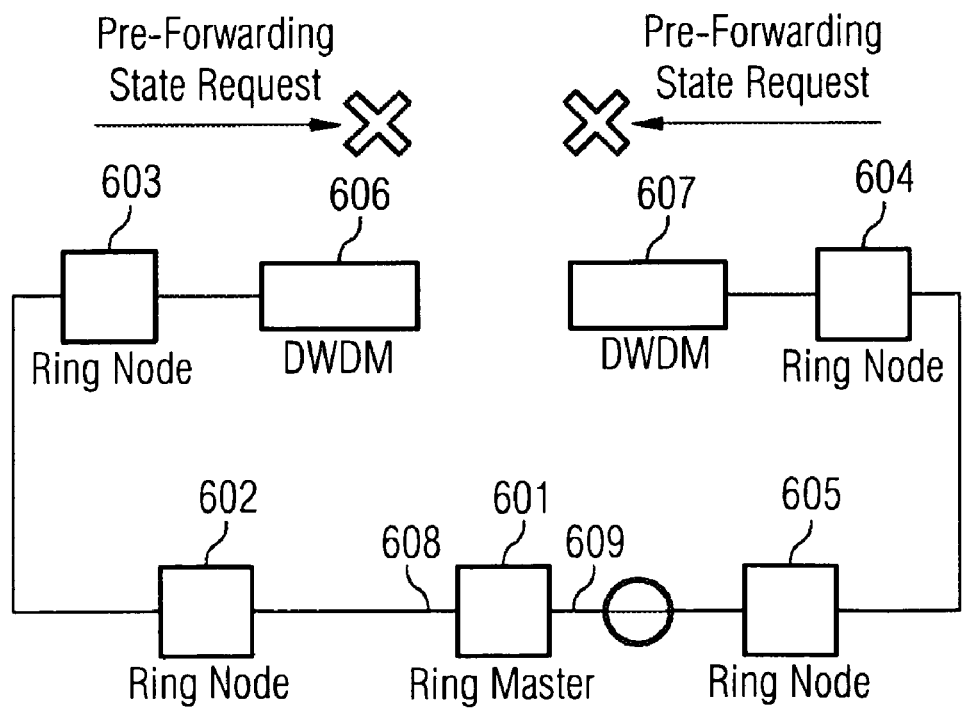
FIG. 14 shows the ring network of FIG. 13, wherein the "Pre-Forwarding State Request" messages could not be forwarded due to a broken link between the non-Ethernet conform network elements.

As shown in FIG. 14, the network element 603 sends the "Pre-Forwarding State Request" to its adjacent network element 606 and the network element 604 sends the "Pre-Forwarding State Request" to its adjacent network element 607.

However both such requests are directed to non-Ethernet network elements 606 and 607, which will not be able to respond accordingly. Furthermore, there will be no Acknowledge message from the next ERP-conform network elements 604 (for the "Pre-Forwarding State Request" sent by network element 603) and 603 (for the "Pre-Forwarding State Request" sent by network element 604), because of the broken link between the network elements 606 and 607.

Figure 15:
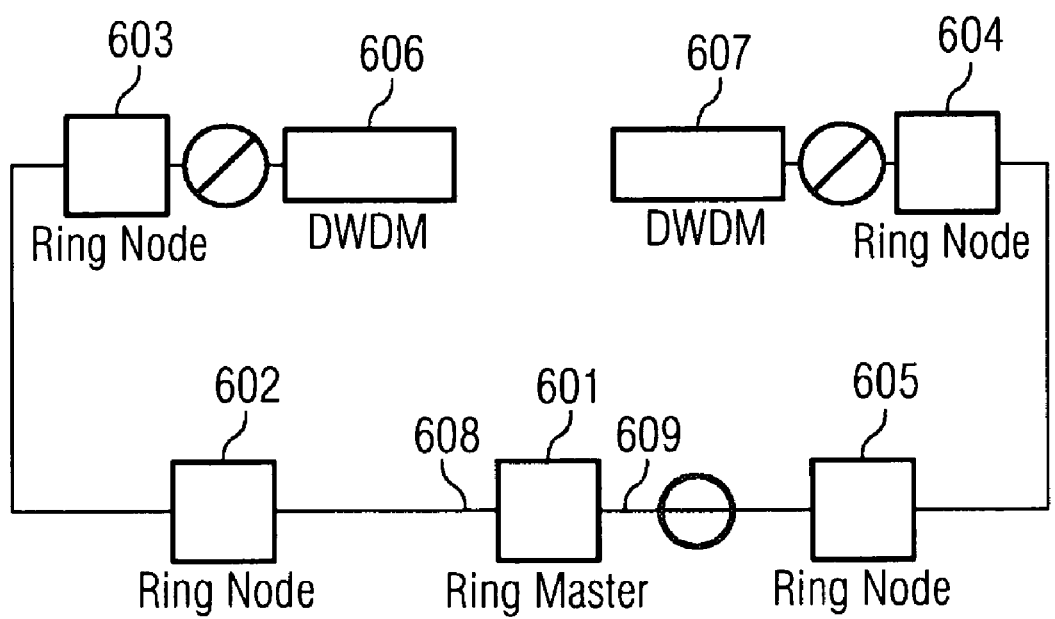
FIG. 15 shows the ring network of FIG. 14, wherein the network elements not successfully forwarding the "Pre-Forwarding State Request" messages enter a pre-forwarding state thereby blocking their ports at which no Acknowledge message has been received.

Hence, without receiving an Acknowledge message, each of the network elements 603 and 604 will enter a pre-forwarding state thereby blocking its port directed to the adjacent network element that did not send the expected Acknowledge message (see FIG. 15).

The Acknowledge message could be deemed missing after a predetermined period of time. In addition or alternatively, the respective network element 603 or 604 may try to send the "Pre-Forwarding State Request" a certain number of times and afterwards enter the pre-forwarding state, respectively.

Once the link between the network elements 606 and 607 is operative again, the Ring Master 601 receives its health-check messages at both of its ports. The Ring Master 601 then blocks its secondary port 609 and sends a message to the network elements indicating that they should return to normal operation (hence enter forwarding state). Such message arriving at the network element 603 and/or the network element 604 leads to a respective state change: The network element switches from its pre-forwarding state to the forwarding state and unblocks its previously blocked port. Thus, the ring network is in normal operation again.

The approach provided herewith has in particular the following advantages:

A failure within the network can be detected and correctly removed from a layer 2 path.

A temporary loop will be avoided as nodes adjacent to the link failure will enter a pre-forwarding state that can be administered by the ring master.

The invention claimed is:

1. A method of operating a network, which comprises:
providing the network with:
a plurality of network elements connected via a ring;
wherein a first segment comprises a non-Ethernet connection and a second segment is an Ethernet connection;
the ring including at least one first segment and at least one second segment; wherein one network element of the network elements is a ring master having a primary port and a secondary port;
wherein a network element of the at least one second segment runs an Ethernet ring protection mechanism using test packets;
the method which comprises the following steps:
detecting a failure of at least one of the at least one first segment by the ring master;
unblocking the secondary port of the ring master;
sending a first message by the ring master via the primary port and via the secondary port;
responding, with each network element that received the first message, with an acknowledge message and forwarding the first message to a next network element; if a network element does not receive an acknowledge message, entering a pre-forwarding state with the network element, the pre-forwarding state being a state in which the network element blocks all traffic except the test packets and waits to switch over to normal operation;
in the pre-forwarding state, blocking a port of the network element toward the network element that did not send the acknowledge message;

sending a second message to the ring master with the network element entering the pre-forwarding state;

after recovery of the failure, blocking the secondary port of the ring master and sending a third message via the primary port and via the secondary port; and upon receiving the third message, switching each network element residing in the pre-forwarding state to the normal operation.

2. The method according to claim 1, wherein the second message is a message informing about a network element having entered the pre-forwarding state.

3. The method according to claim 1, wherein the first message is a pre-forwarding state request.

4. The method according to claim 1, which comprises sending the first message via a protocol that addresses a network element that is directly connected to the sending network element.

5. The method according to claim 1, which comprises sending the first message via a slow protocol.

6. The method according to claim 1, wherein the non-Ethernet connection comprises at least one of the following connections:

a wave division multiplexing connection; and a dense wave division multiplexing connection.

7. The method according to claim 1, wherein the Ethernet ring protection mechanism comprises at least one of the following:

an Ethernet Ring Protection (ERP) protocol;

an Ethernet Automatic Protection Switching (EAPS) protocol.

8. The method according to claim 1, which comprises running the method repeatedly.

9. The method according to claim 1, which comprises sending the test packets by the ring master via the primary port and via the secondary port thereof.

10. The method according to claim 9, which comprises sending the test packets via a control virtual LAN.

11. A device of a network, comprising a processor unit arranged and configured to execute the steps of the method according of claim 1 on said processor.

12. The device according to claim 11, wherein said device is a communication device.

13. The device according to claim 11, wherein said device is a network element.

14. A communication system, comprising the device according to claim 11.

* * * * *